(12) United States Patent
Von Bordelius et al.

(10) Patent No.: US 8,454,098 B2
(45) Date of Patent: Jun. 4, 2013

(54) WHEEL FOR FURNITURE ROLLER WITH LOCKING DEVICE

(75) Inventors: Ralph Von Bordelius, Herrenberg (DE); Oswald Flik, Althengstett (DE)

(73) Assignee: Gross + Froelich GmbH & Co. KG, Weil der Stadt (DE)

( * ) Notice: Subject to any disclaimer, the term of this patent is extended or adjusted under 35 U.S.C. 154(b) by 177 days.

(21) Appl. No.: 12/735,484

(22) PCT Filed: Feb. 24, 2009

(86) PCT No.: PCT/EP2009/052140
§ 371 (c)(1),
(2), (4) Date: Jul. 20, 2010

(87) PCT Pub. No.: WO2009/109479
PCT Pub. Date: Sep. 11, 2009

(65) Prior Publication Data
US 2010/0299869 A1    Dec. 2, 2010

(30) Foreign Application Priority Data
Mar. 5, 2008    (DE) .................. 10 2008 012 791

(51) Int. Cl.
*A63C 17/22*    (2006.01)
(52) U.S. Cl.
USPC .................................... 301/5.309; 301/5.306
(58) Field of Classification Search
USPC ................ 16/35 R, 45; 188/1.12, 19, 20, 31; 301/5.301, 5.302, 5.305–5.307, 5.309
See application file for complete search history.

(56) References Cited

U.S. PATENT DOCUMENTS

| 3,730,594 | A | * | 5/1973 | Zbikowski | 301/64.701 |
| 4,114,952 | A | * | 9/1978 | Kimmell | 301/5.7 |
| 4,193,639 | A | * | 3/1980 | Pauly et al. | 301/35.61 |
| 4,358,162 | A | * | 11/1982 | Schneider et al. | 301/64.706 |
| 5,083,341 | A | * | 1/1992 | Milbredt et al. | 16/35 R |
| 5,368,133 | A |   | 11/1994 | Yang | |

(Continued)

FOREIGN PATENT DOCUMENTS

| DE | 195 46 224 A1 | 6/1997 |
| DE | 200 07 532 U1 | 7/2000 |
| DE | 202 06 038 U1 | 7/2002 |
| DE | 20 2004 016 8 U1 | 2/2006 |

OTHER PUBLICATIONS

Search Report of German Patent Office dated Nov. 28, 2008 (4 pages).
Form PCT/ISA/210 dated Jun. 12, 2009 (3 pages).
Form PCT/ISA/237 (6 pages).

*Primary Examiner* — Victor Batson
*Assistant Examiner* — Matthew Sullivan
(74) *Attorney, Agent, or Firm* — Flynn, Thiel, Boutell & Tanis, P.C.

(57) ABSTRACT

The invention relates to a wheel for a furniture roller having a locking device, having a rigid wheel core with a hub for holding an axle and having an elastic wheel casing as a running surface. According to the invention, in order to be able to realize a locking device which is effective even for small wheel diameters, an inwardly pointing toothing is provided on an outer ring of the wheel core, wherein at least one aperture is formed in the outer ring between the tooth flanks, into which aperture a web, which is aligned axially in parallel and which is offset radially inward with respect to the running surface, of the wheel casing engages in a positively locking manner.

7 Claims, 3 Drawing Sheets

U.S. PATENT DOCUMENTS

| | | |
|---|---|---|
| 6,382,364 B1 | 5/2002 | Chuang |
| 6,532,624 B1 | 3/2003 | Yang |
| 6,619,438 B1 | 9/2003 | Yang |
| 7,032,980 B2 * | 4/2006 | Herbert et al. ........... 301/64.707 |
| 8,051,533 B2 * | 11/2011 | Block et al. ................... 16/35 R |
| 2009/0113671 A1 * | 5/2009 | Chu ............................... 16/35 R |

* cited by examiner

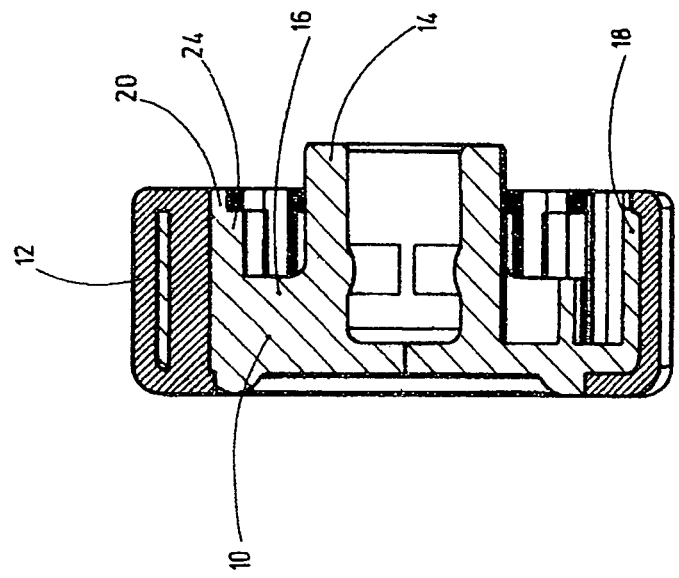
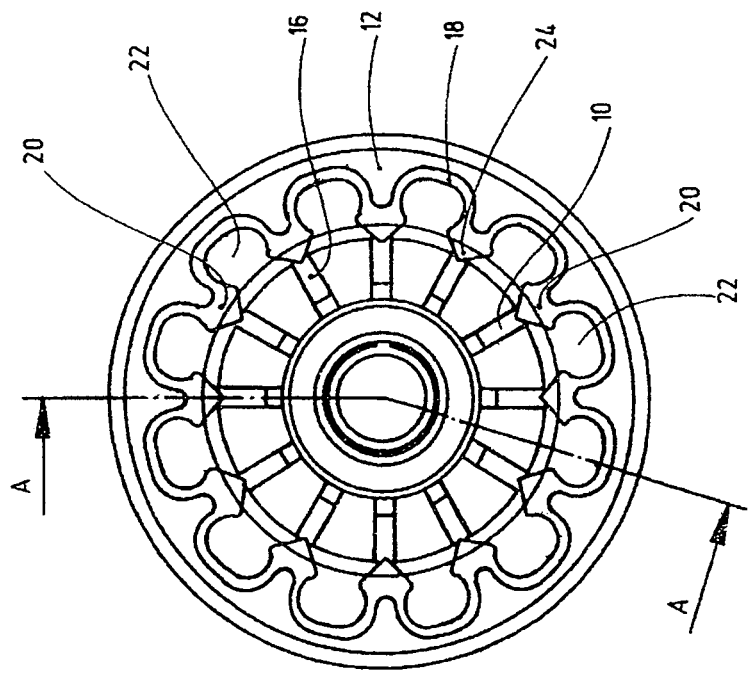

WHEEL FOR FURNITURE ROLLER WITH LOCKING DEVICE

The invention relates to a wheel for a furniture roller having a locking device, having a rigid wheel core with a hub for holding an axle and having an elastic wheel casing as a running surface, and to a furniture roller having such a wheel.

A fundamental distinction is drawn between rollers with wheels that have a hard running surface for a relatively soft underlying surface, e.g. carpet, and rollers with wheels that have a soft running surface for a relatively hard underlying surface, e.g. parquet or stone flooring. Both types of roller can be fitted with a locking device. Wheels that have a soft running surface have a wheel core made from a rigid material and a wheel casing made from an elastic material surrounding the wheel core. Hard rollers and soft rollers of relatively large diameter are generally locked by means of a lever which is mounted pivotably on the roller body and has two integrally formed pins or an inserted steel pin which, in the case of twin rollers, enter into a toothed ring on the wheels and lock the latter. In the case of soft wheels with a small diameter, e.g. less than 40 to 50 mm, however, it is not possible to employ this principle since there is insufficient space between the wheel hub and the wheel casing for a toothed ring on the wheel casing and for a locking pin, owing to the fact that the wheel casing is comparatively thick. Instead, a known roller is provided with a toothing on the outer circumference of the wheel hub, into which a toothed segment on the locking lever can engage. Owing to the small diameter of the hub, the forces acting on the toothing can be large and can lead to the toothing being damaged or the locking lever slipping. In another known roller with soft wheel running surfaces, a toothed ring similar to that on hard rollers is provided on the inner circumference of the wheel rim, as is a locking lever with a pin. However, the toothed ring is composed of the elastic material, and the teeth can therefore be deformed under relatively high loads, causing the pin to slip.

Taking this as a starting point, it is the object of the present invention to make available a roller wheel that has a soft rolling surface and a diameter of less than 40 to 50 mm and allows effective and reliable locking of the wheel without slipping.

To achieve this object, a novel combination of features is proposed. Advantageous embodiments and developments of the invention will also become readily apparent.

The invention starts especially from the realization that, to provide a reliable and wear-resistant locking mechanism, the toothed ring should have a diameter which is as large as possible and should be composed of the hard material of the wheel core. According to the invention, the wheel therefore has an inwardly pointing toothing on an outer ring of the wheel core, with at least one aperture being formed in the outer ring, between the tooth flanks, into which aperture a web of the wheel casing engages in a positively locking manner, said web being aligned axially parallel and being offset radially inward with respect to the running surface.

When the wheel is used with a roller on which the locking device has a locking lever that is pivotably mounted on the roller body and a locking element which is arranged on the locking lever and which can be brought into engagement with the recesses in the wheel core, which are open toward the hub, in particular a pin formed integrally on the locking lever or inserted into the lever, provision is made, in an advantageous embodiment of the invention, for a recess which is open radially toward the inside to be formed between each pair of teeth of the toothing in order to hold the locking element of the locking device. It is then expedient for an aperture to be formed in the outer ring of the wheel core between each pair of recesses open toward the hub, and thus a corresponding number of webs is formed on the wheel casing and good retention of the wheel casing on the wheel core is ensured. Furthermore, the recesses in the outer ring of the wheel core, which are open radially toward the inside, can have undercuts into which the locking element of the locking device can be latched. There is then no need for a separate means of securing the locking lever in the locking position.

The invention is particularly advantageous if the diameter of the wheel is less than 45 mm, in particular less than 40 mm.

The wheel core can be composed of metal or a hard plastic and the wheel casing can be composed of an elastically flexible plastic.

The invention will be explained in greater detail below by means of the illustrative embodiments depicted schematically in the drawing. In the drawings:

BRIEF DESCRIPTION OF THE DRAWINGS

FIG. 1 shows a side view of a wheel with a hard wheel core and an elastic wheel casing;

FIG. 2 shows a section through the wheel along the line A-A in FIG. 1;

Figure 3:
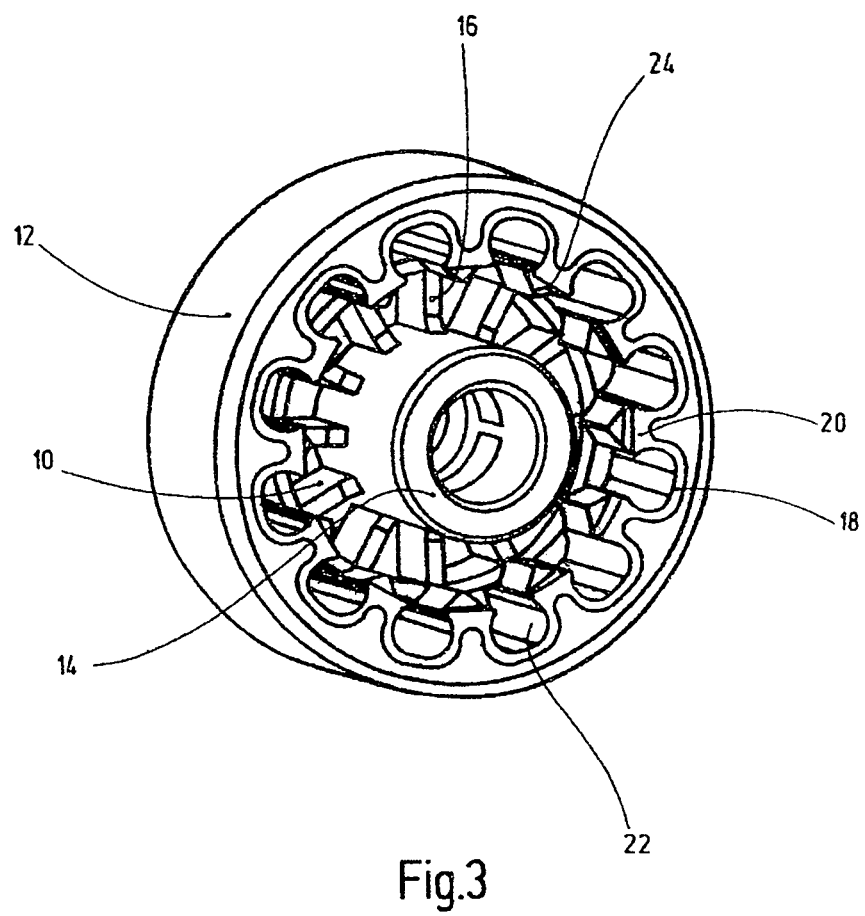
FIG. 3 shows a perspective view of the wheel shown in FIG. 1.

The wheel depicted in the drawing, which has a small diameter of less than about 45 mm, essentially comprises a wheel core 10 made of a hard plastic material or metal and an elastic wheel casing 12. The predominant practice is to arrange wheels of this kind in pairs on an axle of a twin roller. The wheel core 10 has a hub 14 for holding an axle and an outer ring 18, which is connected to the hub 14 by spoke-type connecting webs 16. The outer ring 18 has a multiplicity of teeth 20, which point radially inward and delimit recesses 22 for holding a locking element of a locking device of a roller to which the wheel belongs, said recesses being open radially toward the inside. The teeth 20 have undercuts, allowing the locking element to latch into the recesses 22. The teeth 20 furthermore have tips 24, which deflect the locking element sideways in the direction of a recess 22 if the relative position requires it and/or which ensure appropriate rotation of the wheel.

Figure 4:
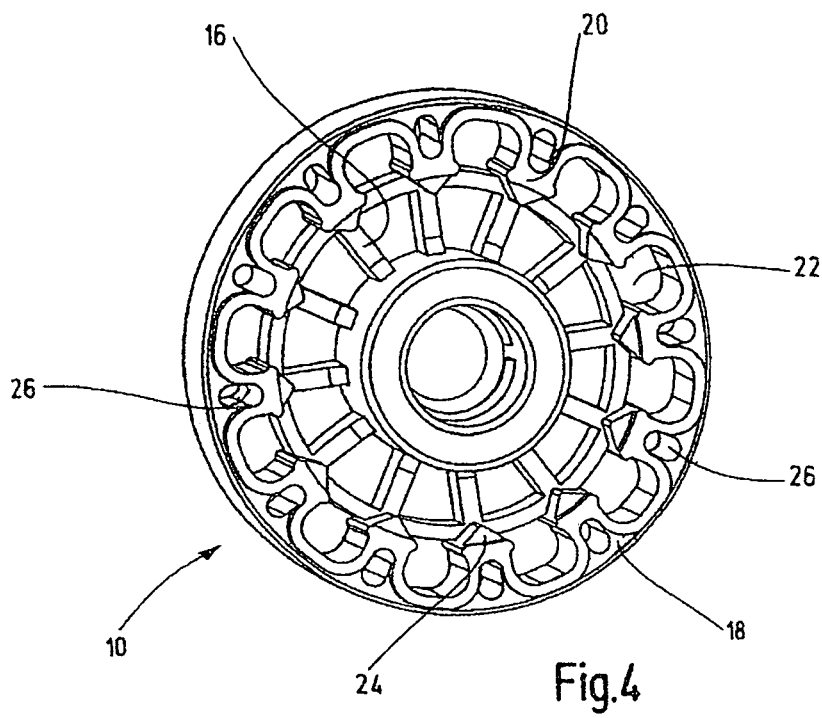
FIG. 4 shows a perspective view of the wheel core of the wheel shown in FIG. 1 without the wheel casing.
Figure 5:
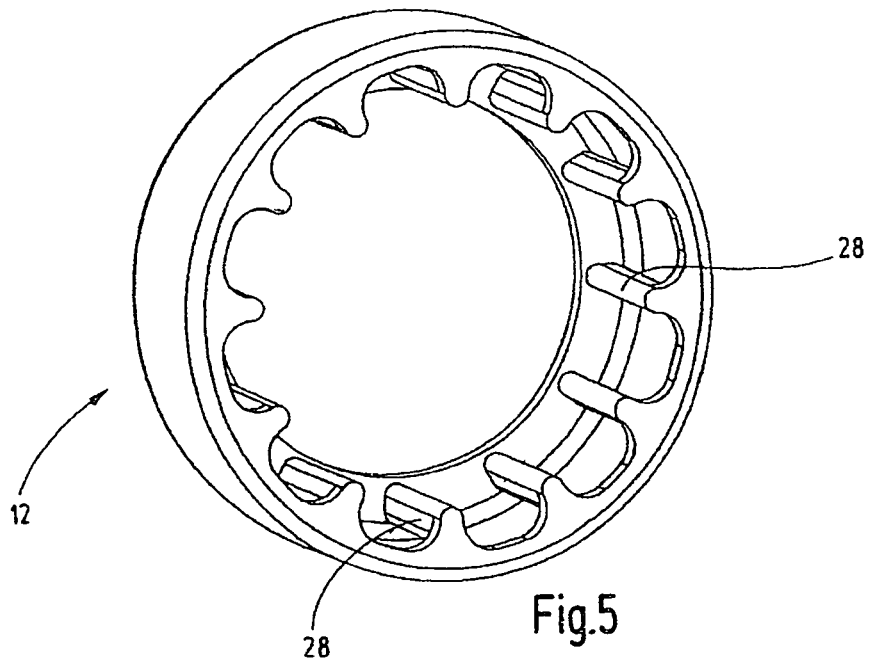
FIG. 5 shows a perspective view of the wheel casing.

In the region of the teeth 20, the outer ring 18 has apertures 26 (FIG. 4), through which axially parallel webs 28 (FIG. 5) of the wheel casing 12 surrounding the wheel core 10 pass. Even if one such aperture is sufficient in principle to anchor the wheel casing, it is expedient if each tooth or at least a large proportion of the teeth has such an aperture 26, as depicted. The webs 28 of the wheel casing 12 are formed automatically in a number corresponding to that of the apertures 26 during the injection molding of the wheel casing. Even if the apertures are depicted as through openings in the drawing, that is not to say that adequate anchoring of the wheel casing 12 on the wheel core 10 could not also be brought about by more or less pronounced depressions in the teeth 20 and by projections on the wheel casing 12 that engage therein. Such an embodiment is deemed to be equivalent to the solution depicted. The wheel casing 12, which is composed of a flexible plastic, is molded onto the wheel core 10 by means of an injection molding method and, in addition to the positive locking, there is also nonpositive locking between the wheel core 10 and the wheel casing 12. Whereas previously the entire area of the wheel casing and of the wheel core had a four-layer radial structure (from the outside inward: wheel casing, outer area of the outer ring of the wheel core, inner wheel casing area, inner area of the outer ring—as shown in the top half of FIG. 2), and it was possible for the toothing to be provided only on the inner area of the outer ring, just two layers of material are present in the area of the recesses 22 in the illustrative embodiment depicted: wheel casing and outer area of the outer ring (as shown in the bottom half of FIG. 2). It is this gain of space that enables the reliable and durable locking mechanism to be achieved.

Since the teeth 20 are on the outer ring 18 of the wheel core, a favorable ratio of forces is obtained for the locking device. In addition, the wheel core 10 is composed of a material which is hard in comparison with the wheel casing 12, making the wheel-side part of the locking device mechanically robust and durable.

In summary, the following may be stated: the invention relates to a wheel for a furniture roller having a locking device, having a rigid wheel core 10 with a hub 14 for holding an axle and having an elastic wheel casing 12 as a running surface. To make it possible to achieve an effective locking device, even where the wheel diameter is small, the proposal according to the invention is that an inwardly pointing toothing 20 be provided on an outer ring 18 of the wheel core 10, with at least one aperture 26 being formed in the outer ring 18, between the tooth flanks, into which aperture a web 28 of the wheel casing 12 engages in a positively locking manner, said web being aligned axially parallel and being offset radially inward with respect to the running surface.

The invention claimed is:

1. A wheel for a furniture roller having a locking device, having a rigid wheel core (10) with a hub (14) for holding an axle and having an elastic wheel casing (12) as a running surface, characterized by an inwardly pointing toothing (20) on an outer ring (18) of the wheel core (10), with at least one aperture (26) being formed through the outer ring (18), between the tooth flanks, into which aperture a web (28) of the wheel casing (12) engages and extends through in a positively locking manner, said web being aligned axially parallel and being offset radially inward with respect to the running surface wherein the aperture (26) is formed in the outer ring (18) of the wheel core (10) between each pair of recesses (22) in the outer ring, said recesses being open toward the hub (14) and the apertures (26) and recesses (22) in the outer ring (18) of the wheel core (1) overlap radially.

2. The wheel as claimed in claim 1, characterized in that a recess (22) which is open radially toward the inside is formed between each pair of teeth (20) of the toothing in order to hold a locking element of the locking device.

3. The wheel as claimed in claim 1, characterized in that the wheel casing (12) is molded onto the wheel core (10), forming the webs (28) of the wheel casing (12) which pass through the apertures (26).

4. The wheel as claimed in claim 1, characterized in that the diameter of the wheel is less than 45 mm, in particular less than 40 mm.

5. The wheel as claimed in claim 2, characterized in that the recesses (22) in the outer ring (18) of the wheel core (10), which are open radially toward the inside, have undercuts into which the locking element of the locking device can be latched.

6. The wheel as claimed in claim 1, characterized in that the wheel core (10) is composed of metal or a hard plastic and the wheel casing (12) is composed of an elastically flexible plastic.

7. A furniture roller having at least one wheel as claimed in claim 1.

* * * * *